(12) United States Patent
Huh et al.

(10) Patent No.: US 10,811,765 B2
(45) Date of Patent: Oct. 20, 2020

(54) METHOD FOR PERFORMING WIRELESS COMMUNICATIONS AND ELECTRONIC DEVICE SUPPORTING THE SAME

(71) Applicant: Samsung Electronics Co., Ltd., Suwon-si, Gyeonggi-do (KR)

(72) Inventors: Jaeyoung Huh, Suwon-si (KR); Seunggil Jeon, Suwon-si (KR); Sunghoon Moon, Suwon-si (KR); Kyungwoo Lee, Suwon-si (KR); Sungchul Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/694,299

(22) Filed: Nov. 25, 2019

(65) Prior Publication Data

US 2020/0212547 A1 Jul. 2, 2020

(30) Foreign Application Priority Data

Dec. 27, 2018 (KR) ........................ 10-2018-0170154

(51) Int. Cl.
| | |
|---|---|
| *H01Q 1/27* | (2006.01) |
| *H04M 1/725* | (2006.01) |
| *H04B 17/318* | (2015.01) |
| *H01Q 1/52* | (2006.01) |
| *H01Q 3/24* | (2006.01) |

(Continued)

(52) U.S. Cl.
CPC ............. *H01Q 1/273* (2013.01); *H01Q 1/241* (2013.01); *H01Q 1/526* (2013.01); *H01Q 3/24* (2013.01); *H04B 1/385* (2013.01); *H04B 17/318* (2015.01); *H04M 1/72527* (2013.01); *H04B 2001/3866* (2013.01)

(58) Field of Classification Search
CPC combination set(s) only.
See application file for complete search history.

(56) References Cited

U.S. PATENT DOCUMENTS

| | | |
|---|---|---|
| 8,957,835 B2 | 2/2015 | Hoellwarth |
| 10,056,054 B2 * | 8/2018 | Fraccaroli ............ G02B 27/017 |

(Continued)

OTHER PUBLICATIONS

European Search Report dated Feb. 24, 2020, Issued in European Application No. 19212076.4-1220.

(Continued)

*Primary Examiner* — Junpeng Chen
(74) *Attorney, Agent, or Firm* — Jefferson IP Law, LLP

(57) ABSTRACT

An electronic device is provided. The electronic device includes a housing configured to mount at least a part of an external device operating 5th generation (5G) mobile communication, a support member connected to one region of the housing to support wearing of the electronic device with respect to one region of a user's body, a second antenna module disposed in a first region of the housing adjacent to a first antenna module among at least one antenna module included in the external device to face at least a part of the first antenna module, at least one third antenna module disposed in at least one of a second region of the housing or a third region of the support member, and at least one conductive member electrically connecting between the second antenna module and the at least one third antenna module.

20 Claims, 16 Drawing Sheets

(51) Int. Cl.
    *H01Q 1/24*    (2006.01)
    *H04B 1/3827*  (2015.01)

(56) References Cited

U.S. PATENT DOCUMENTS

| | | |
|---|---|---|
| 10,146,302 B2 * | 12/2018 | Tokubo |
| 10,305,175 B2 * | 5/2019 | Psychoudakis ........ H04B 1/385 |
| 10,397,297 B2 | 8/2019 | Park et al. |
| 10,514,754 B2 | 12/2019 | Tokubo |
| 2007/0191071 A1 | 8/2007 | Spampinato et al. |
| 2012/0329407 A1 * | 12/2012 | Rousu .................. H01Q 3/2605 |
| | | 455/90.2 |
| 2013/0194141 A1 * | 8/2013 | Okajima ................ H04B 1/385 |
| | | 343/718 |
| 2014/0187179 A1 | 7/2014 | Ferguson |
| 2015/0198811 A1 | 7/2015 | Hoellwarth |
| 2015/0311580 A1 | 10/2015 | Okano |
| 2016/0085076 A1 | 3/2016 | Hoellwarth |
| 2018/0062248 A1 * | 3/2018 | Psychoudakis ........ H01Q 13/24 |
| 2018/0091577 A1 | 3/2018 | Park et al. |
| 2018/0095529 A1 | 4/2018 | Tokubo |
| 2018/0259778 A1 | 9/2018 | Pu et al. |
| 2018/0270900 A1 | 9/2018 | Zhu et al. |
| 2018/0323508 A1 * | 11/2018 | Chigusa .................. H01Q 1/22 |
| 2019/0198983 A1 * | 6/2019 | Moore ..................... G02C 5/22 |

OTHER PUBLICATIONS

International Search Report dated Mar. 20, 2020, Issued in International Application No. PCT/KR2019/016226.

* cited by examiner

METHOD FOR PERFORMING WIRELESS COMMUNICATIONS AND ELECTRONIC DEVICE SUPPORTING THE SAME

CROSS-REFERENCE TO RELATED APPLICATION(S)

This application is based on and claims priority under 35 U.S.C. § 119(a) of a Korean patent application number 10-2018-0170154, filed on Dec. 27, 2018, in the Korean Intellectual Property Office, the disclosure of which is incorporated by reference herein in its entirety.

BACKGROUND

1. Field

The disclosure relates to an electronic device performing wireless communication.

2. Description of Related Art

Wireless communication protocols have been proposed to more efficiently transmit and receive information resources, which are involved in the operation of the function or service of an electronic device, to and from an external device. For example, in recent years, application of a next-generation mobile communication technology using an ultra-high frequency signal, also called 5th generation (5G) mobile communication technology, has been considered for electronic devices. The 5G mobile communication technology refers to the wireless communication protocol defined by the 3rd generation partnership project (3GPP) and enables high-speed or large-capacity data transmission and reception using a millimeter wave (mmWave) signal.

The electronic device may include an antenna module supporting the operation of the 5G mobile communication. With regard to improving communication efficiency by suppressing interference of radio waves, the antenna module in the electronic device may be disposed in a region in which the antenna module does not overlap with the body of a user holding the electronic device. As such, a shaded region corresponding to a region (or a region where the placement of an antenna module is excluded) that a beam formed from the antenna module does not reach may occur in the electronic device.

The above information is presented as background information only to assist with an understanding of the disclosure. No determination has been made, and no assertion is made, as to whether any of the above might be applicable as prior art with regard to the disclosure.

SUMMARY

An electronic device using the 5th generation (5G) mobile communication standard may be coupled to a head mounted display (HMD) device worn by a user. In this regard, a direction faced by an antenna module of the electronic device that transmits and receives service data to or from an access point (or a server or the like) may be changed irregularly depending on the body movement of the user wearing the HMD device. Accordingly, when the directionality between the antenna module and the access point does not correspond, for example, when a shaded region on the electronic device faces the access point, the signal reception efficiency of the electronic device may be reduced, thereby restricting service provision through the HMD device.

Aspects of the disclosure are to address at least the above-mentioned problems and/or disadvantages and to provide at least the advantages described below. Accordingly, an aspect of the disclosure is to provide an electronic device capable of supporting the operation of 5G mobile communication of an external device based on the antenna module by including an antenna module for covering the shaded region of an external device mounted in one region, and a wireless communication performing method of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a housing configured to mount at least a part of an external device operating 5G mobile communication, a support member connected to one region of the housing to support wearing of the electronic device with respect to one region of a user's body, a second antenna module disposed in a first region of the housing adjacent to a first antenna module among at least one antenna module included in the external device to face at least a part of the first antenna module, at least one third antenna module disposed in at least one of a second region of the housing and a third region of the support member, and at least one conductive member electrically connecting between the second antenna module and the at least one third antenna module.

In accordance with another aspect of the disclosure, an external signal received via at least a part of the at least one third antenna module may be delivered to the second antenna module based on the at least one conductive member to be induced to the first antenna module adjacent to the second antenna module. A signal of the external device, which is induced from the first antenna module to the second antenna module, may be delivered to the at least part of the at least one third antenna module based on the at least one conductive member and radiated to an outside.

In accordance with another aspect of the disclosure, an electronic device is provided. The electronic device includes a housing in which at least a part of an external device operating communication in a frequency band of 20 gigahertz (GHz) or more is mounted, a second antenna module disposed in a first region of the housing adjacent to a first antenna module among at least one antenna module included in the external device to face at least a part of the first antenna module, at least one third antenna module disposed in a second region of the housing, and at least one conductive member electrically connecting between the second antenna module and the at least one third antenna module.

In accordance with another aspect of the disclosure, an external signal received via at least a part of the at least one third antenna module may be delivered to the second antenna module based on the at least one conductive member to be induced to the first antenna module adjacent to the second antenna module. A signal of the external device, which is induced from the first antenna module to the second antenna module, may be delivered to the at least part of the at least one third antenna module based on the at least one conductive member and radiated to an outside. At least one antenna element included in the first antenna module, at least one antenna element included in the second antenna module, or at least one antenna element included in the at least one third antenna module may correspond to one another one-to-one such that a delay line according to a wave front of the signal is maintained during signal transmission/reception.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
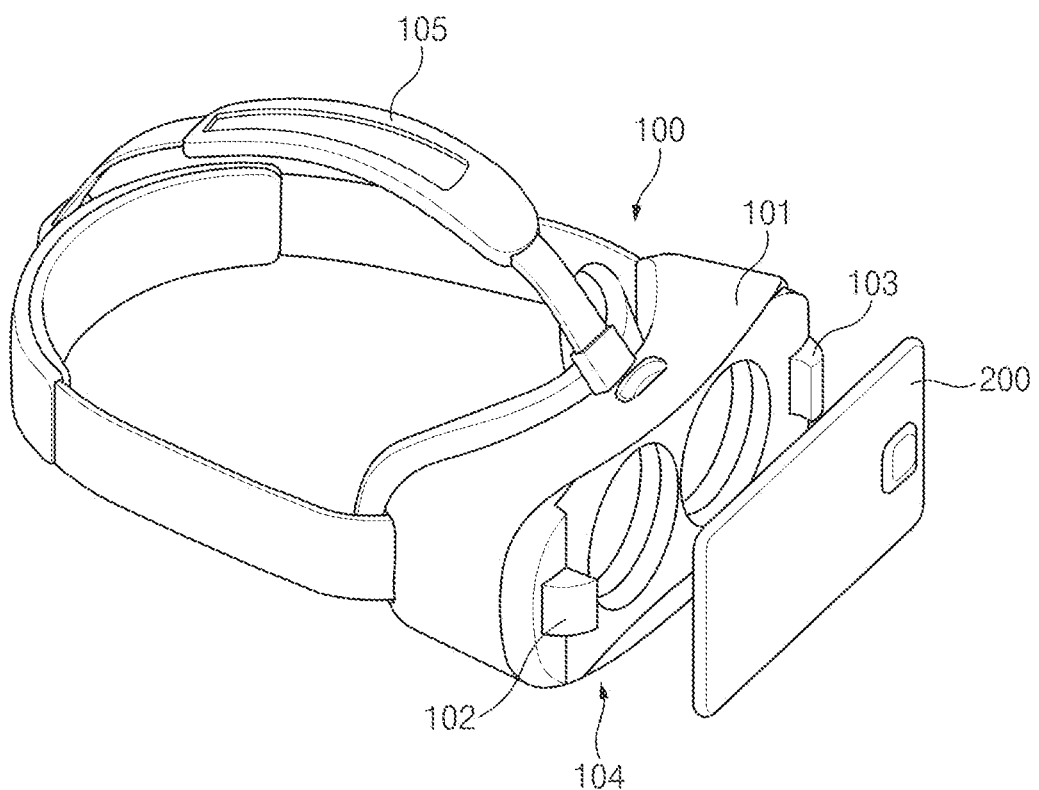
FIG. 1 is a view illustrating an example of an operation of an electronic device, according to an embodiment of the disclosure.

FIG. 1 is a view illustrating an example of an operation of an electronic device, according to an embodiment of the disclosure.

Figure 2:
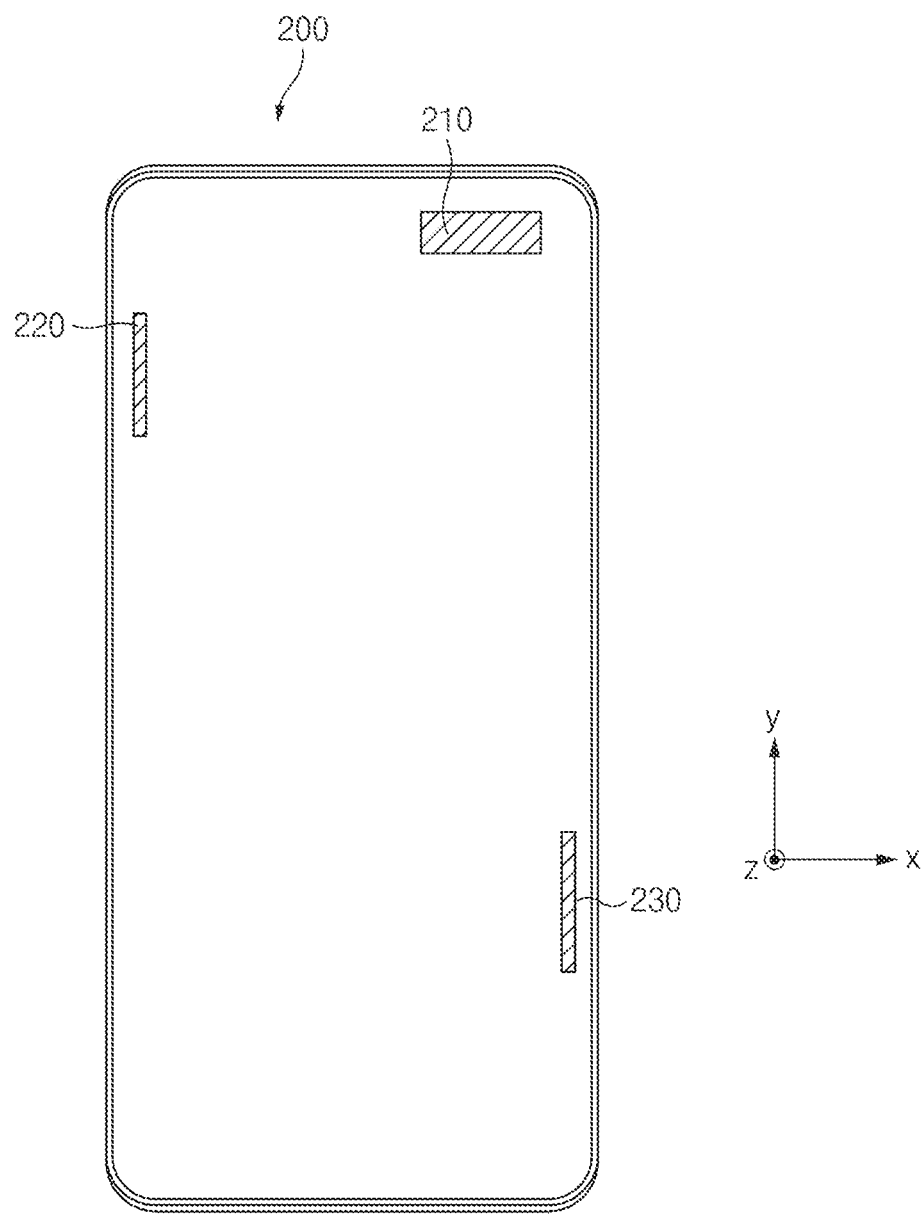
FIG. 2 is a view illustrating an interior of an external device, according to an embodiment of the disclosure.

FIG. 2 is a view illustrating an interior of an external device, according to an embodiment of the disclosure.

Figure 3:
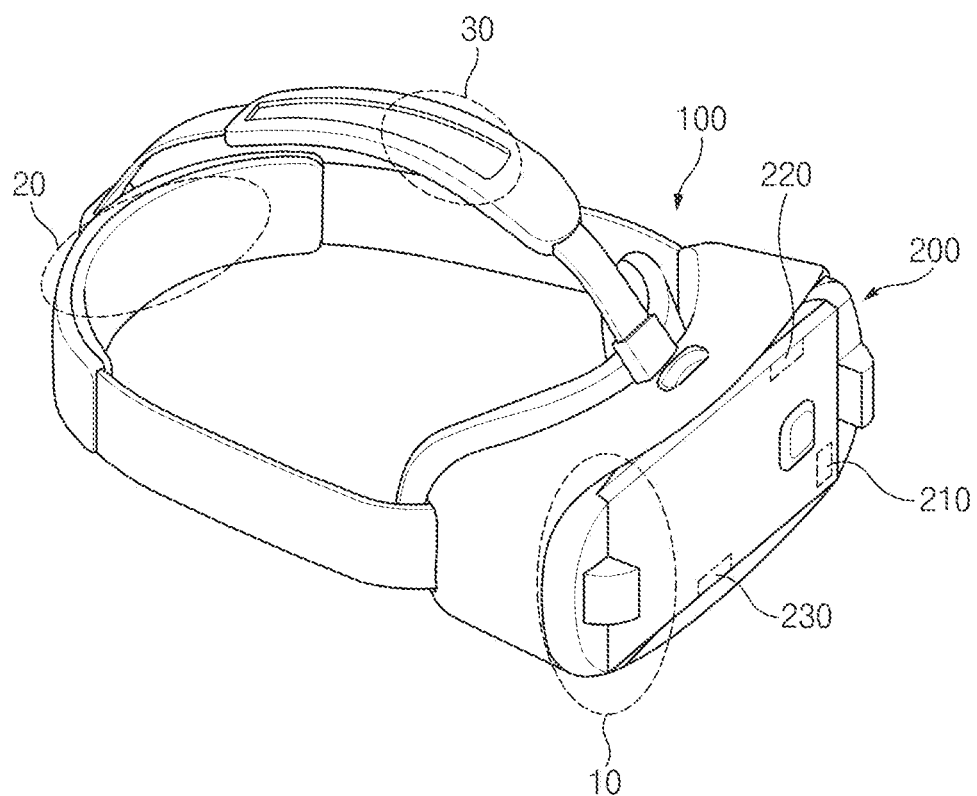
FIG. 3 is a view illustrating a shaded region on an electronic device, according to an embodiment of the disclosure.

FIG. 3 is a view illustrating a shaded region on an electronic device, according to an embodiment of the disclosure.

Referring to FIG. 1, an electronic device 100 according to an embodiment may interact with an external device 200 (e.g., a smartphone). For example, the electronic device 100 may fasten to at least a part of the external device 200 to mount the external device 200 and may display content output through a display of the external device 200 on a field of view of a user of the electronic device 100. Thus, the electronic device 100 may provide a content service such as virtual reality or augmented reality.

In an embodiment, the electronic device 100 may include a housing 101 and a support member 105. According to various embodiments, the electronic device 100 may further include a lens assembly that displays the content on the field of view of the user while being exposed through one region of the housing 101 so as to face the display of the external device 200. Alternatively, the electronic device 100 may further include an input interface (e.g., a touch pad, a physical button, a joystick, a wheel, or the like), which is disposed in one region of the housing 101 and which supports the reception of a user input associated with the function control (e.g., the audio volume control via a graphical user interface (GUI)) of the electronic device 100.

The housing 101 may internally include components (e.g., antenna modules 110 and 120, a signal strength measuring module 140, a processor 150, and/or a memory 160 to be described with reference to FIG. 7) associated with the functional operation of the electronic device 100, while forming at least a part of the body of the electronic device 100. Alternatively, the housing 101 may include a front frame region 104, of which at least a part is exposed to the outside to provide a space, structure, or cavity in which the external device 200 is mounted. In this regard, at least one fastening member 102 and/or 103 for supporting the connection to the external device 200 may be included in a portion of the front frame region 104. According to an embodiment, the at least one fastening member 102 and/or 103 may function as an input/output interface for transmitting and receiving data while functioning as a fastening means between the electronic device 100 and the external device 200. For example, a connector that is connected to the interface (e.g., a universal serial bus (USB) port, or the like) of the external device 200 to support data transmission/reception to or from the external device 200 may be included in one region of at least one fastening member 102 and/or 103. According to various embodiments, at least a part of the front frame region 104 may be formed of a flexible material such that the space, structure, or cavity may be changed depending on the shape or size of the external device 200 to be mounted.

The support member 105 may support the wearing of the electronic device 100 by the user. For example, the support member 105 may fix the housing 101 on the user's face. In this regard, at least a part of the support member 105 may form a ring shape and may be connected to one region of the housing 101. In various embodiments, for the purpose of increasing ease of wearing the an electronic device 100 by the user, at least a part of the support member 105 may include an elastic material or the support member 105 may include a member (e.g., a buckle, a velcro, a magnet, or the like) for adjusting a length. According to various embodiments, the support member 105 may be included as a part of the housing 101. In this case, it may be understood that the at least partial region of the support member 105 is a region of the housing 101.

Referring to FIG. 2, the external device 200 mounted in the electronic device 100 of FIG. 1 may include at least one antenna module supporting operation of $5^{th}$ generation (5G) mobile communication in an internal region (e.g., an operation of communication using a frequency band of 20 gigahertz (GHz) or more). For example, when viewed in the '−Z' direction with respect to the external device 200 after a rear plate of the external device 200 is removed, the at least one antenna module may include at least one of a first antenna module 210 disposed at the right upper end of the rear surface of the external device 200, a second antenna module 220 disposed at the left upper end of the rear surface, or a third antenna module 230 disposed at the right lower end of the rear surface.

In an embodiment, the first antenna module 210 may include a plurality of patch-type antenna elements disposed toward the rear surface of the external device 200. The first antenna module 210 may generate a beam of a radiation pattern facing a first external direction (e.g., '+Z' direction) from the inside of the external device 200, using the plurality of patch-type antenna elements. Alternatively, the first antenna module 210 may include a plurality of dipole antenna elements and a plurality of shorted patch antennas. The first antenna module 210 may generate a beam of a radiation pattern facing a second external direction (e.g., '+Y' direction) and the display direction (e.g., the direction between '+Y' axis and '−Z' axis on 'Y−Z' plane) of the external device 200 from the inside of the external device 200, using the plurality of dipole antenna elements and a plurality of shorted patch antennas.

In an embodiment, the second antenna module 220 may include a plurality of patch-type antenna elements that are disposed toward the left-side surface of the external device 200 when the rear surface of the external device 200 is referenced. The second antenna module 220 may generate a beam of a radiation pattern facing a third external direction (e.g., '−X' direction) from the inside of the external device 200, using the plurality of patch-type antenna elements.

In an embodiment, the third antenna module 230 may include a plurality of patch-type antenna elements that are disposed toward the right-side surface of the external device 200 based on the rear surface of the external device 200. The third antenna module 230 may generate a beam of a radiation pattern facing a fourth external direction (e.g., '+X' direction) from the inside of the external device 200, using the plurality of patch-type antenna elements.

Referring to FIG. 3, when the external device 200 is mounted in the electronic device 100, the operation of the 5G mobile communication of the external device 200 may be at least partly restricted. For example, at least one antenna module 210, 220, and/or 230 included in the external device 200 may be disposed in a specific region (e.g., the right upper end, left upper end, and/or right lower end with respect to the rear surface of the external device 200) of the external device 200. The external device 200 may include a region (e.g., the lower end region of the external device 200) in which the placement of an antenna module is excluded. As such, in an operating environment in which the external device 200 is mounted in the electronic device 100, a first shaded region 10 that is not reached by the beam coverage of the external device 200 may occur in the electronic device 100. For another example, when the external device 200 is mounted in the electronic device 100, at least a part of the external device 200 may be shielded by the structure of the electronic device 100. In this regard, the front frame region 104 of FIG. 1 of the electronic device 100 in which the external device 200 is mounted may include the structure (or at least a part of the housing 101 of FIG. 1) that forms the space, structure, cavity, or the like for accommodating the external device 200. In that case, at least a part of at least one antenna module 210, 220, and/or 230 included in the external device 200 may be shielded by the structure of the electronic device 100 and may be affected by signal interference. As such, in an operating environment in which the external device 200 is mounted in the electronic device 100, a second shaded region 20 and/or 30 that is not reached by the beam coverage of the external device 200 may occur in the electronic device 100. The first shaded region 10 or the second shaded region 20 and/or 30 are according to an embodiment. According to various embodiments, a location of the shaded region occurring in the electronic device 100 may be changeable depending on the placement structure of at least one antenna module 210, 220 and/or 230 or the mounting form of the external device 200, in the external device 200.

When the above descriptions are considered, in a case in which the external device 200 is mounted in the electronic device 100, it may not be easy for the external device 200 to operate using 5G mobile communication through the direction corresponding to the first shaded region 10 or the second shaded region 20 and/or 30. Hereinafter, the electronic device 100 of a configuration capable of supporting the operation of 5G mobile communication of the external device 200 facing the first shaded region 10 or second shaded region 20 and/or 30 and various embodiments associated with this will be described.

Figure 4A:
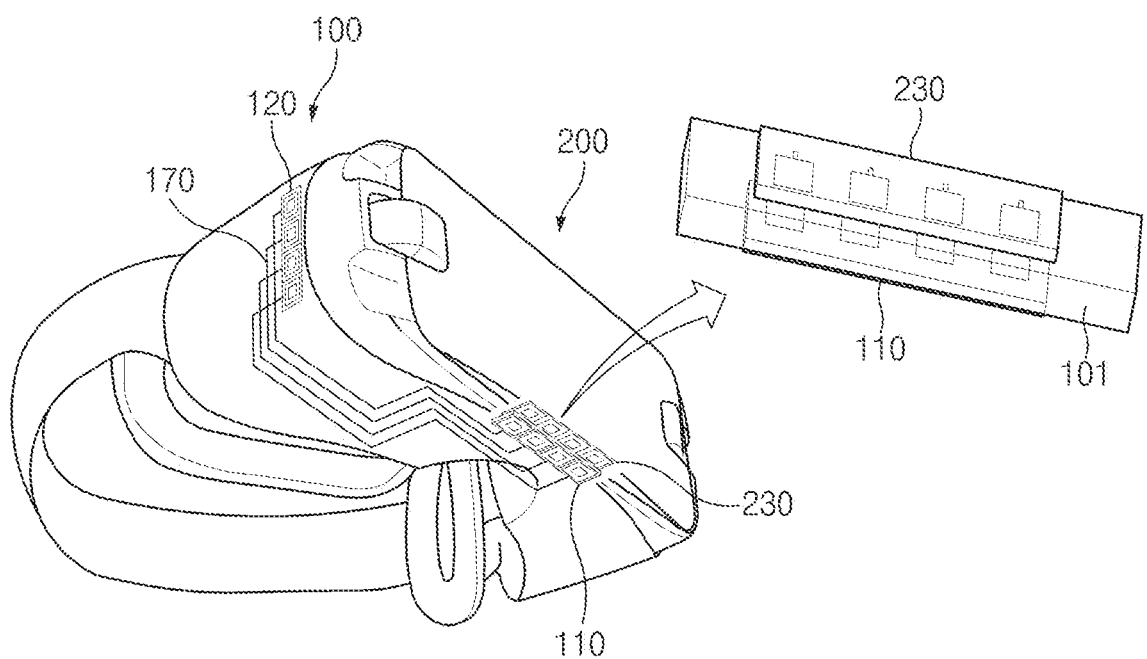
FIG. 4A is a view illustrating a placement form of an antenna module in an electronic device, according to an embodiment of the disclosure.
Figure 4B:
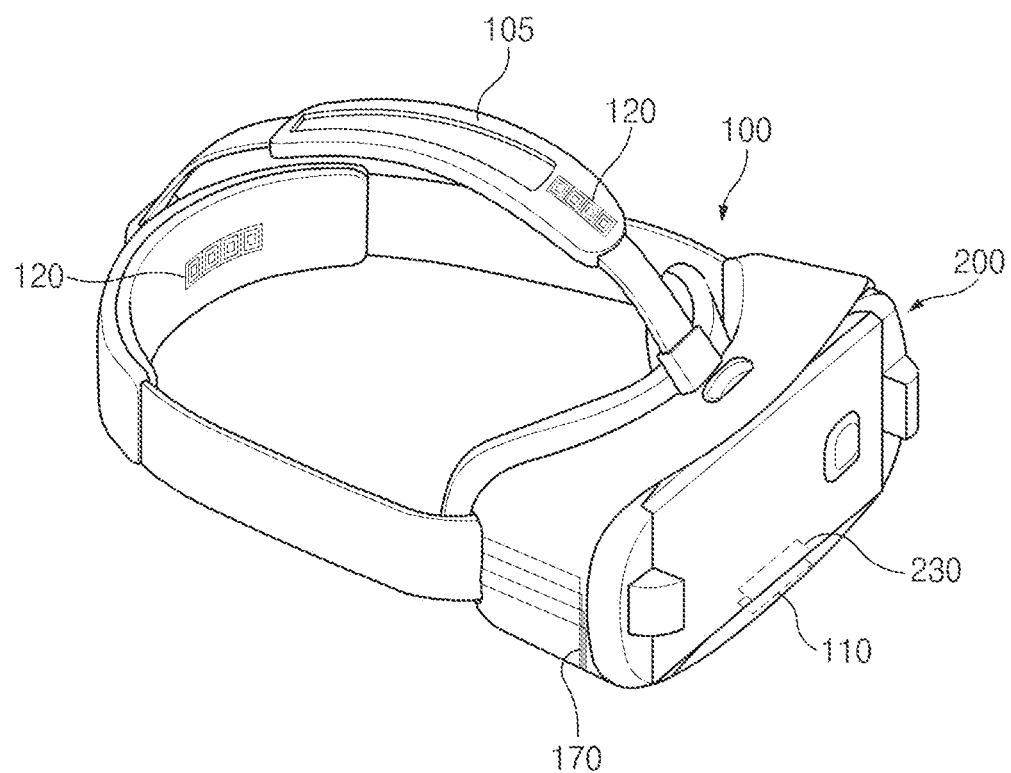
FIG. 4B is a view illustrating a placement form of an antenna module in an electronic device, according to an embodiment of the disclosure.
Figure 4C:
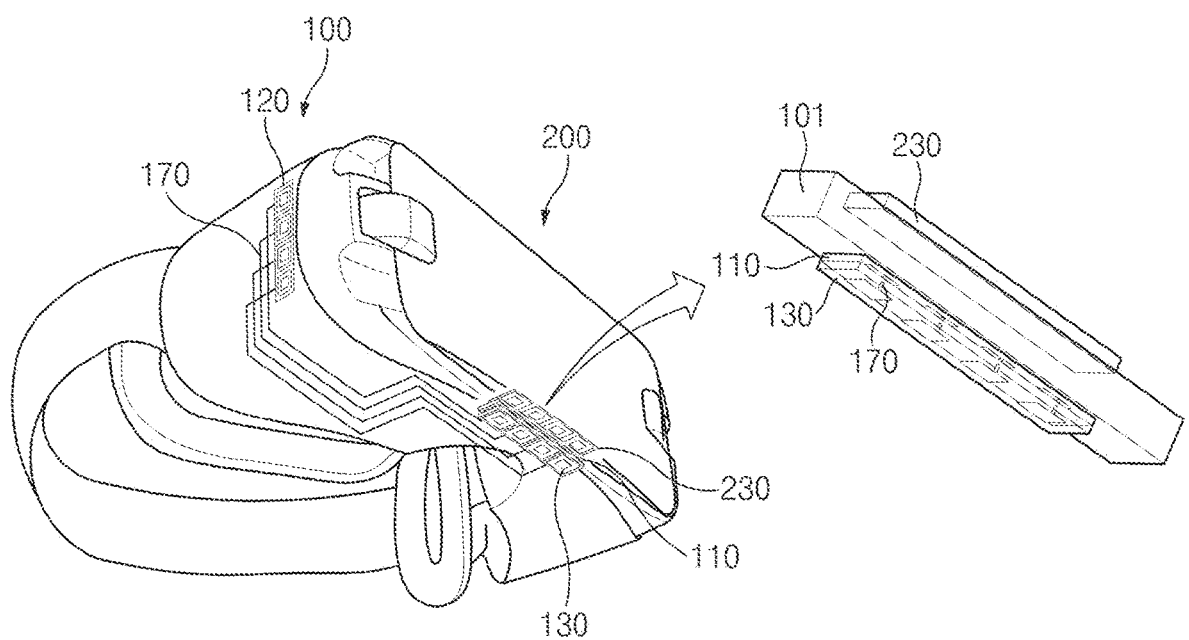
FIG. 4C is a view illustrating a placement form of an antenna module in an electronic device, according to an embodiment of the disclosure.

FIGS. 4A to 4C are views illustrating a placement form of an antenna module in an electronic device, according to various embodiments of the disclosure.

Referring to FIGS. 4A to 4C, the electronic device 100 may include at least one of a first antenna module 110, a second antenna module 120, or a third antenna module 130 for supporting the operation of 5G mobile communication of the external device 200 of FIG. 3.

The first antenna module 110 may be coupled with an antenna module (hereinafter referred to as an "external antenna module") of the external device 200 mounted in the electronic device 100 so as to transmit or receive a signal between each other. In this regard, when the external device 200 is mounted in the front frame region 104 of FIG. 1 of the electronic device 100, the first antenna module 110 may be disposed in the region of the housing 101 close to (or facing) at least a part of the external antenna module of the external device 200. For example, the region of the housing 101 may include the inside of the frame (e.g., the internal space of the housing 101) forming the housing 101 or the interior of the frame itself. According to various embodiments, the first antenna module 110 may be disposed in the first housing region (e.g., the upper end of the front frame region 104) close to the second external antenna module 220 or the second housing region (e.g., the lower end of the front frame region 104) close to the third external antenna module 230, which are forming the beam in the side surface direction with respect to the external device 200 among at least one external antenna module 210, 220, and/or 230 of FIG. 2 included in the external device 200. Hereinafter, an embodiment is exemplified as the first antenna module 110 is disposed close to the third external antenna module 230 of the external device 200.

According to an embodiment, when another antenna module (e.g., the second antenna module 120 or the third antenna module 130) of the electronic device 100 receives a signal from the outside, the first antenna module 110 may receive the signal from the other antenna module, and thus the signal may be induced to the third external antenna module 230 of the coupled external device 200. Alternatively, when the signal is delivered from the communication module included in the external device 200 to the third external antenna module 230, the signal may be induced to the first antenna module 110 coupled with the third external antenna module 230, and the first antenna module 110 may deliver the signal to another antenna module (e.g., the second antenna module 120 or the third antenna module 130) of the electronic device 100. In this regard, the first antenna module 110 and the other antenna module of the electronic device 100 may be electrically connected to each other. For example, the first antenna module 110 and the other antenna module may be connected to a conductive member 170 including at least one of a coaxial cable or a flexible printed circuit board (FPCB).

The second antenna module 120 may transmit or receive a signal to or from the first antenna module 110 via the conductive member 170. For example, the second antenna module 120 may receive a signal induced from the external device 200 to the first antenna module 110 or may deliver a signal received from the outside, to the first antenna module 110. When receiving the signal from the first antenna module 110, the second antenna module 120 may radiate the signal to the outside by performing beamforming According to an embodiment, in a case in which the external device 200 is mounted in the electronic device 100, the second antenna module 120 may be disposed in the region capable of covering the shaded region 10, 20, and/or 30 of FIG. 3 occurring in the electronic device 100. For example, the second antenna module 120 may be disposed in a region, which is not shielded by the structure (or at least a part of the housing 101) of the electronic device 100 or in which the exposure to the outside is good, in the shaded region itself or a region close to the shaded region. According to various embodiments, the second antenna module 120 may be disposed in the region of the housing 101 (e.g., the inside of the frame forming the housing 101 or the interior of the frame itself) corresponding to the side surface of the electronic device 100 or may be disposed in one region (e.g., the region corresponding to the back or crown of a user's head when the user wears the electronic device 100) of the support member 105 connected to the housing 101.

The third antenna module 130 may perform a function at least partly similar to the second antenna module 120. For example, the third antenna module 130 may receive a signal (e.g., a signal induced from the external device 200 to the first antenna module 110) from the first antenna module 110 via the conductive member 170 and may radiate the signal to the outside by performing beamforming. Alternatively, the third antenna module 130 may deliver a signal received from the outside (e.g., an external source) to the first antenna module 110 via the conductive member 170. According to an embodiment, the third antenna module 130 may be disposed in a region capable of covering the signal (e.g., the signal reflected by the ground) received from the lower portion of the electronic device 100 based on a case in which the user wears the electronic device 100. For example, the third antenna module 130 may be disposed in a region of the lower end of the housing 101, of which at least a part faces the ground. For another example, the third antenna module 130 may be disposed in the lower end region of the housing 101. The third antenna module 130 may be disposed in a form close to or stacked with the first antenna module 110 to minimize signal attenuation when the signal is delivered to the first antenna module 110. According to various embodiments, the third antenna module 130 may be excluded from the electronic device 100. For example, when there is no need to receive a signal (or, the signal reflected by the ground) from the lower portion of the electronic device 100 or when the beam coverage of the third external antenna module 230 forming a beam in the side surface direction (e.g., the direction of the lower portion of the electronic device 100 with respect to the electronic device 100) of the external device 200 is secured, the third antenna module 130 may be excluded.

According to various embodiments, the above-described first antenna module 110 may be selectively connected to the second antenna module 120 or the third antenna module 130 via a switch. For example, in a state in which the first antenna module 110 is connected to the second antenna module 120 via the switch, when the first antenna module 110 fails to receive the beam that a base station transmits or when a strength or a quality of the received beam is less than a specified threshold value, the first antenna module 110 may be connected to the third antenna module 130 via the switch to perform a beam search.

According to various embodiments, at least one of the first antenna module 110, the second antenna module 120, or the third antenna module 130, which are described above, may include at least one antenna element. For example, the at least one antenna element may include at least one of a conductive plate, a patch antenna, a shorted patch antenna, a loop antenna, a notch antenna, a slot antenna, or a dipole antenna. In various embodiments, the at least one antenna element may be formed as a single antenna array in at least one of the first antenna module 110, the second antenna module 120, or the third antenna module 130.

Figure 5:
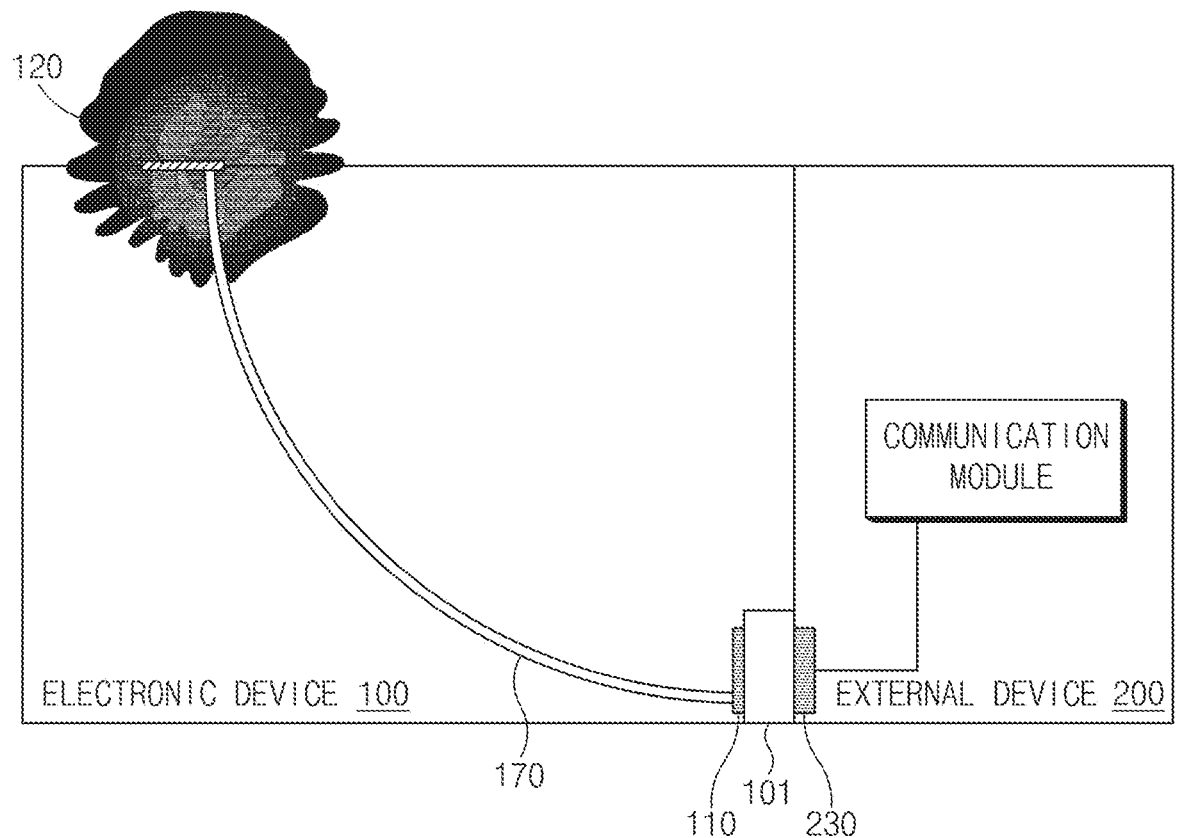
FIG. 5 is a view illustrating a signal processing modeling between antenna modules included in each of an electronic device and an external device, according to an embodiment of the disclosure.

FIG. 5 is a view illustrating a signal processing modeling between antenna modules included in each of an electronic device and an external device, according to an embodiment of the disclosure.

Figure 6:
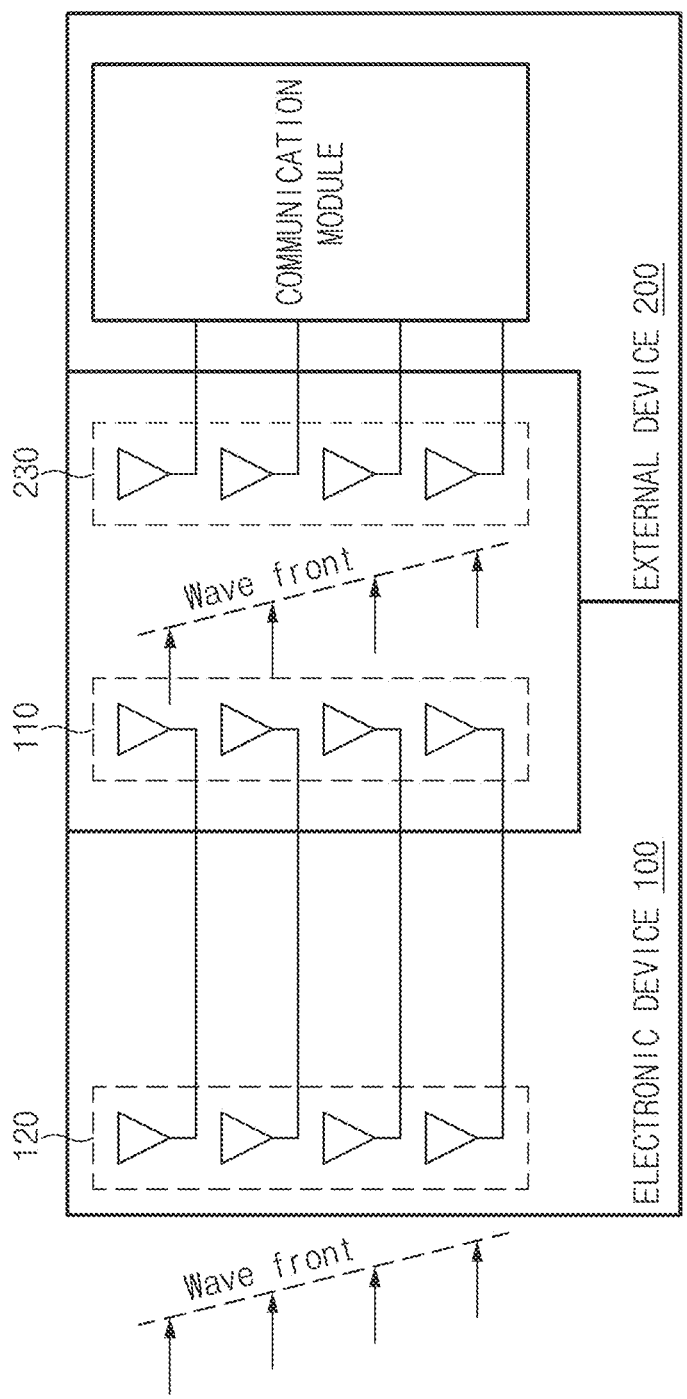
FIG. 6 is a view illustrating a relationship between antenna modules included in each of an electronic device and an external device, according to an embodiment of the disclosure.

FIG. 6 is a view illustrating a relationship between antenna modules included in each of an electronic device and an external device, according to an embodiment of the disclosure.

The specific components described with reference to FIGS. 5 and 6 may be replaced by other components at least partly corresponding to the specific component. For example, the second antenna module 120 referring to FIGS. 5 and 6 may be replaced by the third antenna module 130 of FIG. 4C. Also, the descriptions about the second antenna module 120 may be applied to the third antenna module 130 identically or similarly.

Referring to FIG. 5, the electronic device 100 and the external device 200 may interact with each other to support the operation of 5G mobile communication of at least one external antenna module 210, 220, and/or 230 of FIG. 2 included in the external device 200. In this regard, the electronic device 100 may include a coupler antenna module 110 (e.g., the first antenna module 110 of FIGS. 4A to 4C), which functions as a signal transfer medium between the electronic device 100 and the external device 200, and at least one mirror antenna module 120 (e.g., the second antenna module 120 of FIG. 4A or 4B or the third antenna module 130 of FIG. 4C), which replaces the functional operation of the at least one external antenna module 210, 220, and/or 230.

According to an embodiment, the coupler antenna module 110 may be disposed in a region of the housing 101 of the electronic device 100 close to a part (e.g., 230) of at least one external antenna module 210, 220, and/or 230 of the external device 200 to be coupled with the external antenna module 230, and thus the coupler antenna module 110 may induce a signal to the external antenna module 230 or may receive a signal from the external antenna module 230. In an embodiment, the signal induced to the external antenna module 230 may be delivered to the communication module (e.g., a radio frequency integrated circuit (RFIC)) included in the external device 200. The signal induced to the coupler antenna module 110 may be delivered to the mirror antenna module 120 via the conductive member 170 (e.g., a coaxial cable, a flexible printed circuit board, or the like). In an embodiment, the mirror antenna module 120 may deliver a signal received from the outside to the coupler antenna module 110 to support the reception of a signal of the external device 200 or may radiate a signal received from the coupler antenna module 110 to the outside to support the radiation of the signal of the external device 200.

Referring to FIG. 6, the mirror antenna module 120 (e.g., the second antenna module 120 of FIG. 4A or 4B or the third antenna module 130 of FIG. 4C), the coupler antenna module 110 (e.g., the first antenna module 110 of FIG. 4A, 4B, or 4C), and the external antenna module (e.g., 230) of the external device 200 coupled with the coupler antenna module 110, which are included in the electronic device 100, may have the correlation for suppressing the corruption of a 5G mobile communication-based signal. For example, the mirror antenna module 120, the coupler antenna module 110, and the external antenna module 230 may be configured such that at least one antenna element (or an antenna array) included in each of the modules 120, 110 and 230 corresponds to each other one-to-one and such that a delay line according to the wave front of the signal is maintained, upon transmitting or receiving a signal (or signal transmission or signal induction).

Figure 7:
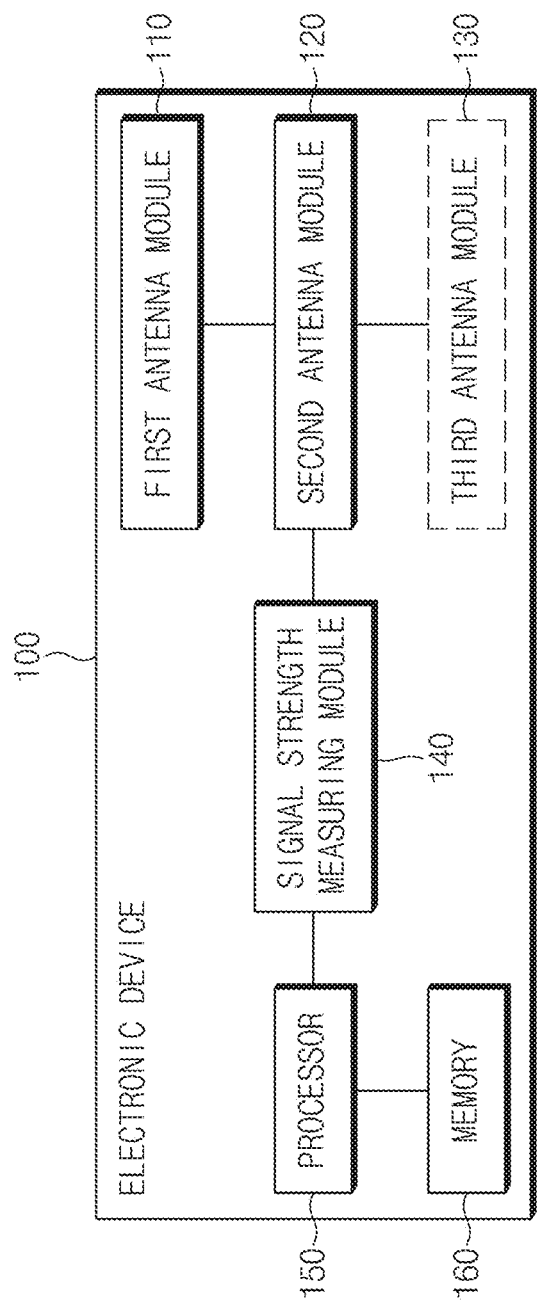
FIG. 7 is a diagram illustrating a configuration of an electronic device, according to an embodiment of the disclosure.

FIG. 7 is a diagram illustrating a configuration of an electronic device, according to an embodiment of the disclosure.

Referring to FIG. 7, the electronic device 100 may further include the signal strength measuring module 140, the processor 150, and the memory 160, which support the operation of the antenna modules, in addition to at least a part of the first antenna module 110, the second antenna module 120, and the third antenna module 130, which are described above.

The signal strength measuring module 140 may measure the strength of a signal received from the outside by at least one of the second antenna module 120 or the third antenna module 130. For example, when the second antenna module 120 or the third antenna module 130 receives a 5G mobile communication-based signal from the outside, the signal strength measuring module 140 may output a received signal strength indicator (RSSI) value by measuring a strength of the signal and may deliver the RSSI value to the processor 150. According to various embodiments, the signal strength measuring module 140 may include a first signal strength measuring module corresponding to the second antenna module 120 and a second signal strength measuring module corresponding to the third antenna module 130. For example, the first signal strength measuring module and the second signal strength measuring module may be independent and implemented as hardware or software. Alternatively, at least a part of the first signal strength measuring module and the second signal strength measuring module may be integrated.

The processor 150 may be implemented with at least one of a central processing unit, an application processor, or a communication processor and may control components of the above-described electronic device 100. For example, the processor 150 may be electrically or operatively connected to the components of the electronic device 100 to deliver at least one command associated with a functional operation to the components or to perform various arithmetic operations, data processing, or the like.

In an embodiment, the processor 150 may determine whether the external device 200 of FIG. 3 is mounted in response to scheduled information in real time or at a specified period. For example, the processor 150 may determine whether the external device 200 is mounted by determining whether a connector included in at least one fastening member 102 and/or 103 of FIG. 1 in the front frame region 104 of FIG. 1 and the interface (e.g., USB port, or the like) of the external device 200 are connected to each other. In an embodiment, the processor 150 may receive, from the signal strength measuring module 140, the RSSI value output as the second antenna module 120 or the third antenna module 130 receives the external signal. The processor 150 may compare the RSSI value with a specified threshold value. When the comparison result indicates that the RSSI value is not less than the specified threshold value, the processor 150 may deliver a specified signal or command to the mounted external device 200. For example, the processor 150 may deliver the signal or command associated with an activation request of the third external antenna module 230 of FIG. 2 of the external device 200 coupled with the first antenna module 110.

The memory 160 may store at least one signal or data associated with the operation of the electronic device 100 or may store at least one instruction associated with the functional operations of components of the electronic device 100. For example, the memory 160 may store data of the specified threshold value used for the functional operation of the processor 150. Alternatively, the memory 160 may store content data received from the external device 200 with regard to the providing of the content service to the user.

Alternatively, the memory 160 may store beam book data used to perform beamforming of the second antenna module 120 or the third antenna module 130.

According to various embodiments, the beam book data may include information associated with the performing of beamforming on at least one direction of the second antenna module 120 or the third antenna module 130.

TABLE 1

| Module | Beam ID | Phase Shift 111 | Phase Shift 112 | Phase Shift 113 | Phase Shift 114 |
|---|---|---|---|---|---|
| Second antenna module 120 | 1 | −270 | −180 | −90 | 0 |
| | 2 | −135 | −90 | −45 | 0 |
| | ... | ... | ... | ... | ... |
| | 5 | 0 | 90 | 180 | 270 |

Table 1 illustrates a form of beam book data that may be stored in the memory 160. Referring to Table 1, the beam book data may include a beam identification (ID) of at least one beam in different directions formed by a specific antenna module (e.g., the second antenna module 120). In an embodiment, the phase shift value of a signal to be delivered to the antenna element of the specific antenna module may be mapped to each beam ID to form a beam in a direction corresponding to the beam ID. For example, the phase shift value may include a control bit for generating a delay time, phase shift angle, or delay.

Figure 8A:
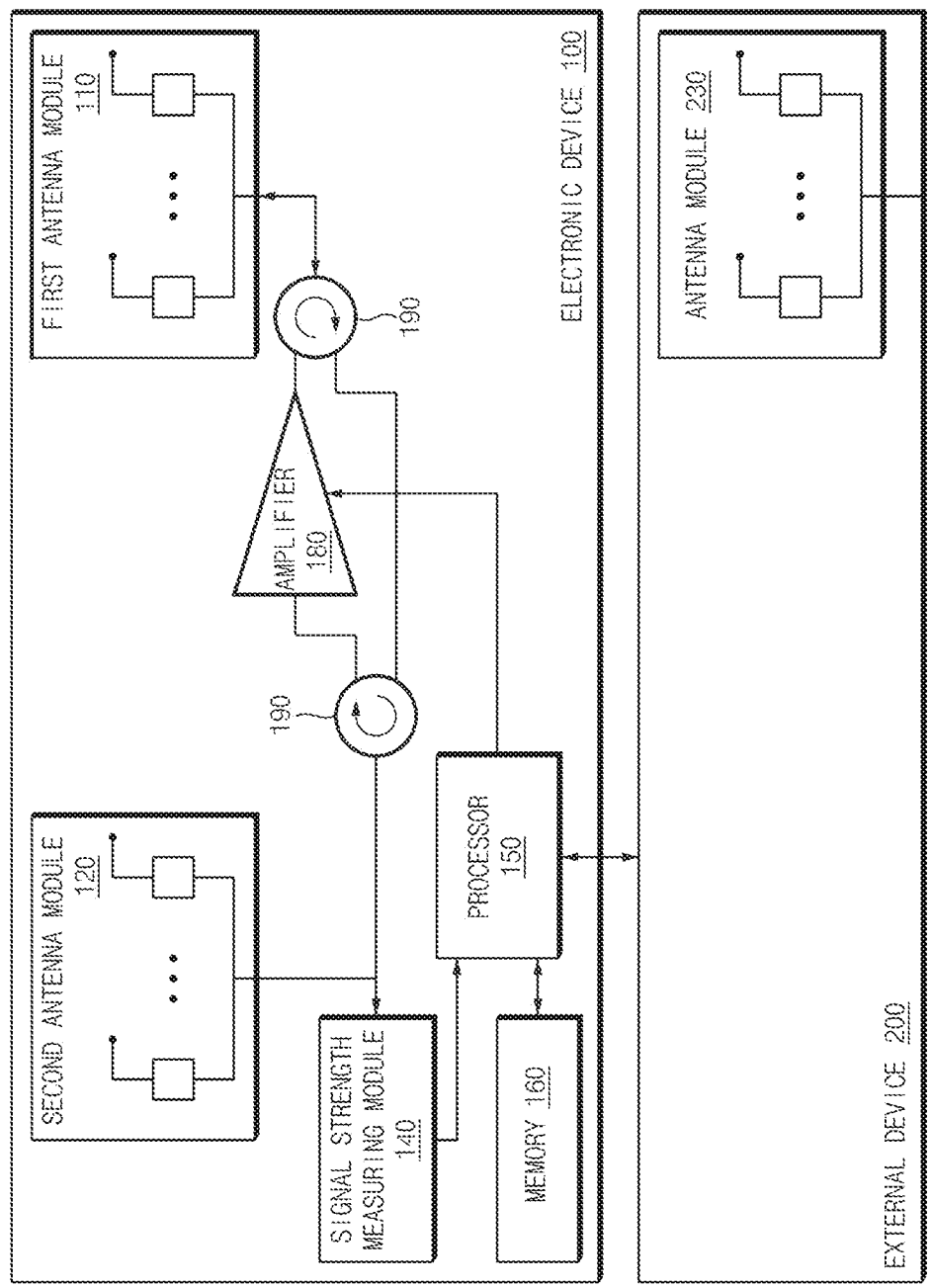
FIG. 8A is a view illustrating a control circuit included in an electronic device, according to an embodiment of the disclosure.
Figure 8B:
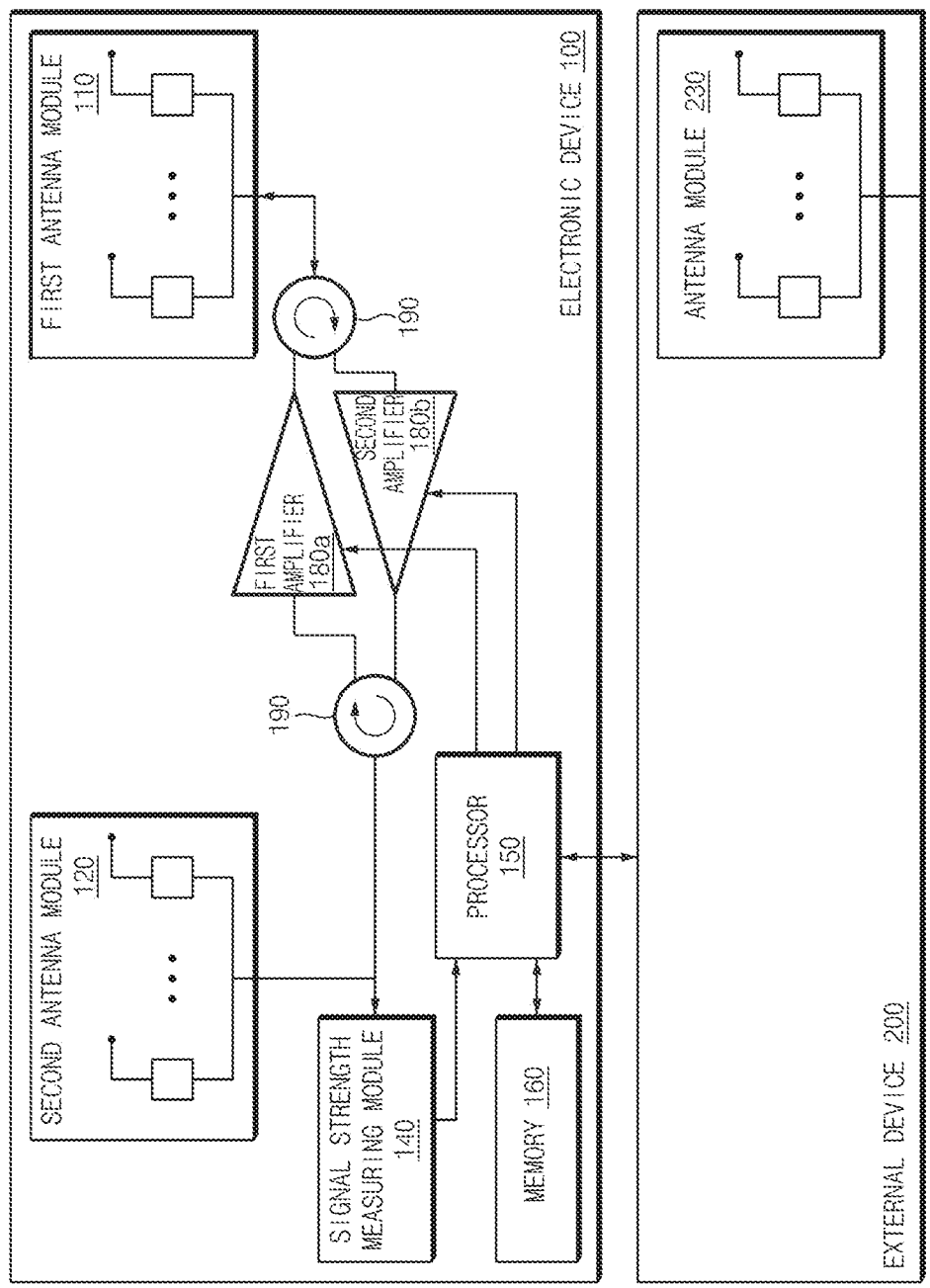
FIG. 8B is a view illustrating a control circuit included in an electronic device, according to an embodiment of the disclosure.
Figure 8C:
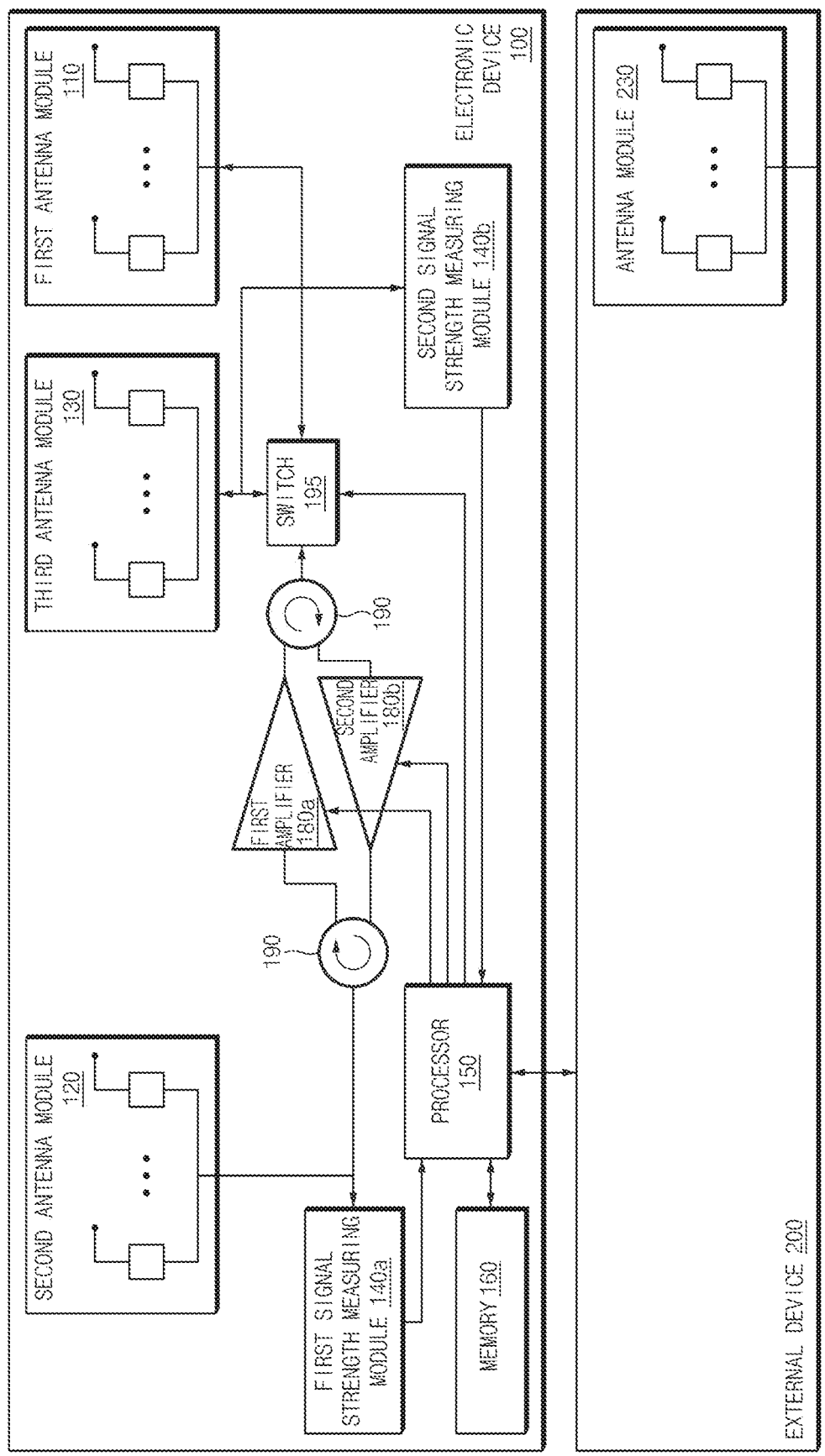
FIG. 8C is a view illustrating a control circuit included in an electronic device, according to an embodiment of the disclosure.

FIGS. 8A to 8C are views illustrating a control circuit included in an electronic device, according to various embodiments of the disclosure. The redundant description of the same component of FIGS. 8A to 8C as that of the aforementioned electronic device may be omitted.

Referring to FIGS. 8A and 8B, in an operation in which a signal received by the second antenna module 120 from the outside is delivered to the first antenna module 110 via the conductive member 170 of FIG. 5 (e.g., a coaxial cable, an FPCB, or the like), the electronic device 100 may include at least one amplifier to compensate for attenuation of the signal depending on a distance between the second antenna module 120 and the first antenna module 110 or a length of the conductive member 170. For example, the electronic device 100 may include an amplifier 180, which is disposed in the conductive member 170 connecting between the second antenna module 120 and the first antenna module 110. The amplifier 180 receives a signal from the second antenna module 120, amplifies the signal, and delivers the amplified output signal to the first antenna module 110. According to an embodiment, the amplifier 180 may be implemented in plurality. For example, the amplifier 180 may include a first amplifier 180a, which amplifies a signal transmitted from the second antenna module 120 to the first antenna module 110, and a second amplifier 180b that amplifies a signal transmitted from the first antenna module 110 to the second antenna module 120. In various embodiments, when at least one amplifier 180, 180a, and/or 180b is disposed in the conductive member 170, at least one circulator 190 for suppressing the damage to the amplifiers 180, 180a, and/or 180b may be further disposed in an adjacent region of the amplifiers 180, 180a, and/or 180b.

Referring to FIG. 8C, when the electronic device 100 includes the third antenna module 130, the electronic device 100 may include a switch 195 for selectively operating one of the second antenna module 120 or the third antenna module 130, which operate as having the same or similar function. In this regard, when receiving the RSSI value of the second antenna module 120 and the RSSI value of the third antenna module 130 from each of a first signal strength measuring module 140a corresponding to the second antenna module 120 and a second signal strength measuring module 140b corresponding to the third antenna module 130, the processor 150 of the electronic device 100 may control the switch 195 by determining the operation of the antenna module by which the relatively high RSSI value is measured. Alternatively, the processor 150 may compare the quality (e.g., whether echo or background noise is included) of the signal received by the second antenna module 120 from the outside with the quality of the signal received by the third antenna module 130 from the outside and may control the switch 195 by determining the operation of the antenna module in which the quality of a signal is relatively good.

Figure 9:
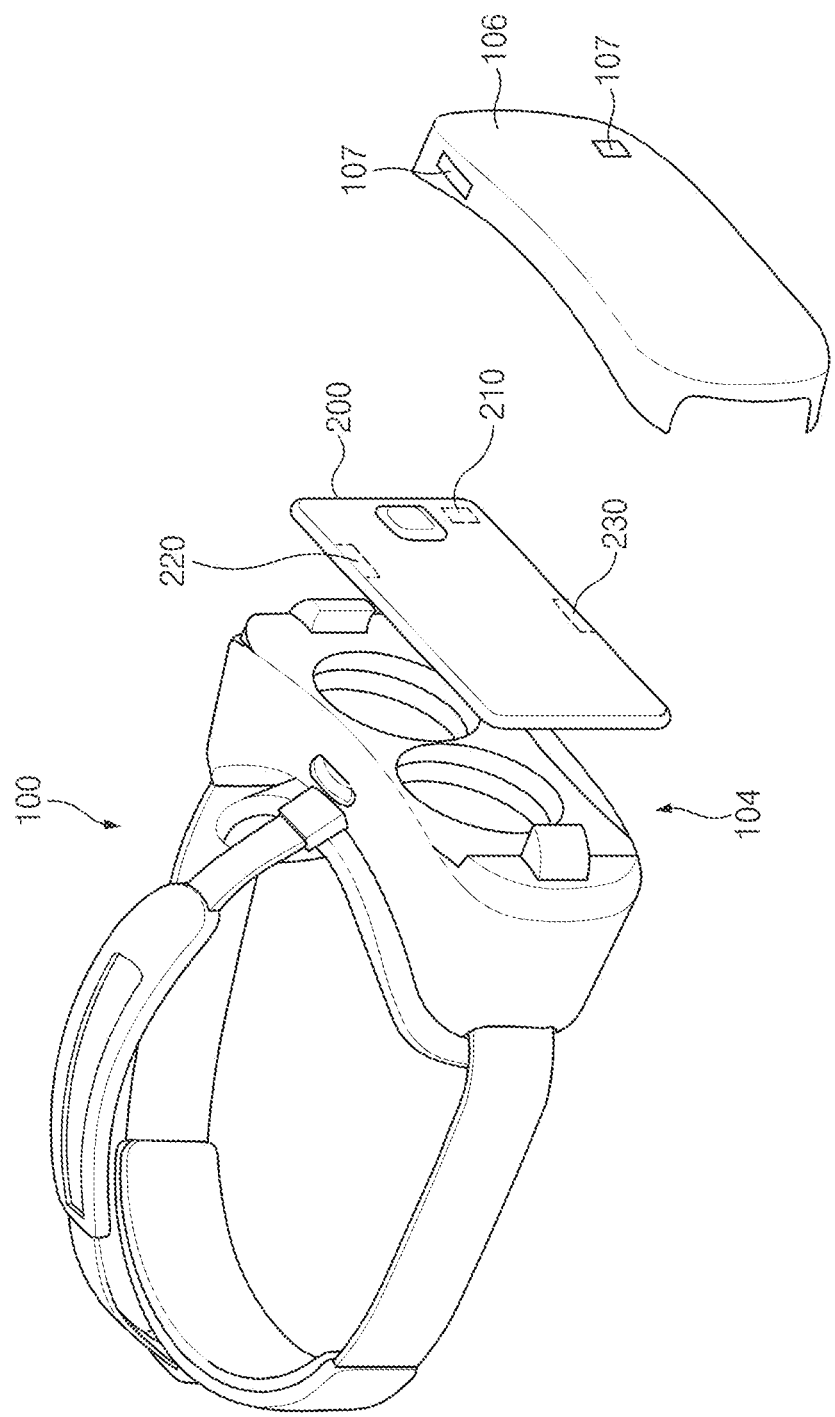
FIG. 9 is a diagram illustrating a cover included in an electronic device, according to an embodiment of the disclosure.

FIG. 9 is a diagram illustrating a cover included in an electronic device, according to an embodiment of the disclosure.

Referring to FIG. 9, the electronic device 100 may further include a cover 106 that may be fastened to the front frame region 104 (or the housing 101 of FIG. 1). For example, the cover 106 may secure the external device 200 mounted in the front frame region 104 or may protect the external device 200 from external shocks. According to various embodiments, the cover 106 may be fastened to the front frame region 104 by a hook, a magnet, or the like.

According to an embodiment, when the cover 106 is fastened to the front frame region 104, at least a part of the external device 200 mounted in the front frame region 104 may be shielded from the outside by the cover 106. Accordingly, in at least one external antenna module 210, 220, and/or 230 included in the external device 200, the efficiency of 5G mobile communication operation may be reduced due to signal interference according to the cover 106. In this regard, the cover 106 may include at least one opening 107 for supporting external exposure of at least one external antenna module 210, 220, and/or 230 included in the external device 200. For example, the cover 106 may include the at least one opening 107 as a region corresponding to at least one external antenna module 210, 220, and/or 230 of the mounted external device 200 when being fastened to the front frame region 104. In various embodiments, the cover 106 may further include an opening for supporting a functional operation of another component (e.g., a camera device, or the like) included in the external device 200.

Figure 10:
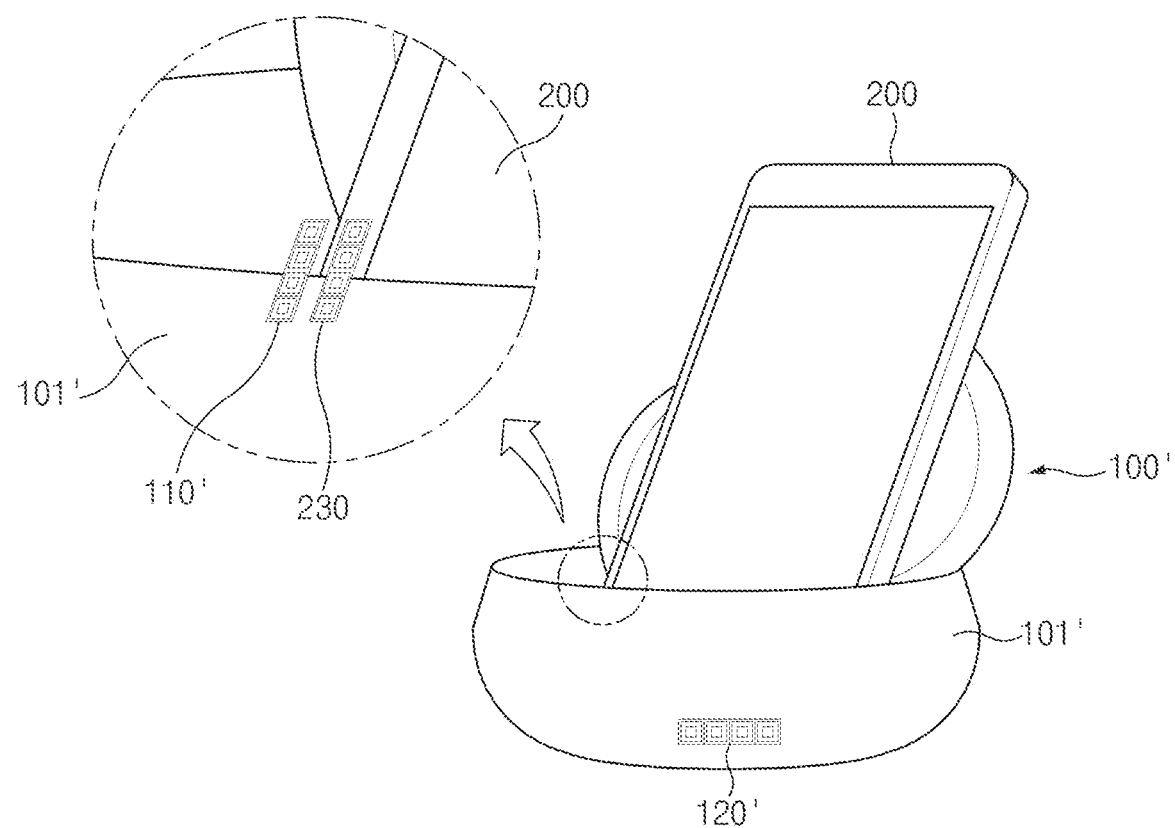
FIG. 10 is a view illustrating an electronic device, according to an embodiment of the disclosure.

FIG. 10 is a view illustrating an electronic device, according to an embodiment of the disclosure.

Referring to FIG. 10, an embodiment is exemplified as the above-described electronic device (the electronic device 100 of FIG. 1) is a head mounted display (HMD) device mounting an external device (the external device 200 of FIG. 1) operating with 5G mobile communication. However, the electronic device 100 may include other devices capable of interacting with the external device 200. For example, in addition to the HMD device, the electronic device 100 may include a dock 100' (or a docking station) in which an external device operating using 5G mobile communication is seated or mounted.

According to an embodiment, the dock 100' may include a housing 101' for seating or mounting the external device 200. For example, the housing 101' may accommodate at least a part of the external device 200. Accordingly, a part (e.g., 230) of at least one external antenna module included in the external device 200 may be at least partly shielded by the housing 101.' In this regard, the dock 100' may include a first antenna module 110' coupled with the external antenna module 230 in the region of the housing 101' corresponding to the external antenna module 230 shielded by the housing 101.' The dock 100' may include a second antenna module 120' connected to the first antenna module 110' via a conductive member (e.g., a coaxial cable, a flexible printed circuit board, or the like) in another region of the housing 101,' for example, a region, in which the exposure to the outside is good. According to an embodiment, the signal induced from the external antenna module 230 of the external device 200 to the first antenna module 110' may be delivered to the second antenna module 120' to be radiated to the outside. The signal received from the outside by the second antenna module 120' may be delivered to the first antenna module 110' to be induced to the external antenna module 230 of the external device 200.

According to the above-described various embodiments, an electronic device may include a housing in which at least a part of an external device operating using 5G mobile communication is mounted, a support member connected to one region of the housing to support wearing of the electronic device with respect to one region of a user's body, a second antenna module disposed in a first region of the housing adjacent to a first antenna module among at least one antenna module included in the external device to face at least a part of the first antenna module, at least one third antenna module disposed in at least one region of a second region of the housing and a third region of the support member, and at least one conductive member electrically connecting between the second antenna module and the at least one third antenna module.

According to various embodiments, an external signal received via at least a part of the at least one third antenna module may be delivered to the second antenna module based on the at least one conductive member to be induced to the first antenna module adjacent to the second antenna module. A signal of the external device, which is induced from the first antenna module to the second antenna module, may be delivered to the at least part of the at least one third antenna module based on the at least one conductive member and radiated to an outside.

According to various embodiments, at least one of the second region of the housing or the third region of the support member may include a region that is not reached by beam coverage of the external device.

According to various embodiments, at least one of the second region of the housing or the third region of the support member may include a region in which the at least one third antenna module is not shielded by a structure of the electronic device.

According to various embodiments, at least one of the first region of the housing or the second region of the housing may include at least one of an internal space of the housing or an interior of a frame itself forming the housing.

According to various embodiments, the second antenna module may be coupled with the first antenna module.

According to various embodiments, the electronic device may further include a fourth antenna module disposed in a fourth region of the housing adjacent to the second antenna module.

According to various embodiments, at least a part of the fourth region may include a region facing a ground.

According to various embodiments, the electronic device may further include a processor and a switch supporting a selective operation of the at least one third antenna module and the fourth antenna module.

According to various embodiments, the processor may be configured to control the switch to operate one of the at least one third antenna module and the fourth antenna module, based on comparison between an RSSI value of the at least one third antenna module and an RSSI value of the fourth antenna module.

According to various embodiments, the electronic device may further include a connector accessed to an interface included in the external device when the external device is mounted.

According to various embodiments, the processor may be configured to determine whether the external device is mounted, based on whether the connector contacts the interface.

According to various embodiments, the processor may be configured to transmit data or a signal associated with an activation request of the first antenna module to the external device when it is determined that at least one of the RSSI value of the at least one third antenna module or the RSSI value of the fourth antenna module is not less than a specified threshold value.

According to various embodiments, the electronic device may further include an amplifier amplifying at least one of an output signal of the second antenna module or an output signal of the at least one third antenna module.

According to various embodiments, at least one antenna element included in the first antenna module, at least one antenna element included in the second antenna module, and at least one antenna element included in the at least one third antenna module may correspond to one another one-to-one.

According to various embodiments, the electronic device may further include a cover fastened to at least a part of the housing.

According to various embodiments, the cover may include an opening in a region corresponding to at least one antenna module included in the external device, when the external device is mounted.

According to various embodiments, the electronic device may include at least one of a head mounted display (HMD) device or a dock device.

According to the above-described various embodiments, an electronic device may include a housing in which at least a part of an external device communicating in a frequency band of 20 GHz or more is mounted, a second antenna module disposed in a first region of the housing adjacent to a first antenna module among at least one antenna module included in the external device to face at least a part of the first antenna module, at least one third antenna module disposed in a second region of the housing, and at least one conductive member electrically connecting between the second antenna module and the at least one third antenna module.

According to various embodiments, an external signal received via at least a part of the at least one third antenna module may be delivered to the second antenna module based on the at least one conductive member to be induced to the first antenna module adjacent to the second antenna module. A signal of the external device, which is induced from the first antenna module to the second antenna module, may be delivered to the at least part of the at least one third antenna module based on the at least one conductive member and radiated to an outside. At least one antenna element included in the first antenna module, at least one antenna element included in the second antenna module, and at least one antenna element included in the at least one third antenna module may correspond to one another one-to-one such that a delay line according to a wave front of the signal is maintained during signal transmission/reception.

According to various embodiments, the second region of the housing may include a region that is not reached by beam coverage of the external device.

According to various embodiments, the second region of the housing may further include a partial region of a support member connected to one region of the housing to support wearing of the electronic device with respect to one region of a user's body.

According to various embodiments, the electronic device may further include a fourth antenna module disposed in a third region of the housing adjacent to the second antenna module.

According to various embodiments, the electronic device may further include a processor and a switch supporting a selective operation of the at least one third antenna module and the fourth antenna module.

According to various embodiments, the processor may be configured to control the switch to operate one of the at least one third antenna module and the fourth antenna module, based on comparison between quality of a signal received by the at least one third antenna module and quality of a signal received by the fourth antenna module.

According to various embodiments, the processor may be configured to transmit data or a signal associated with an activation request of the first antenna module to the external device when it is determined that at least one of strength of a signal received by the at least one third antenna module or strength of a signal received by the fourth antenna module is not less than a specified threshold value.

Figure 11:
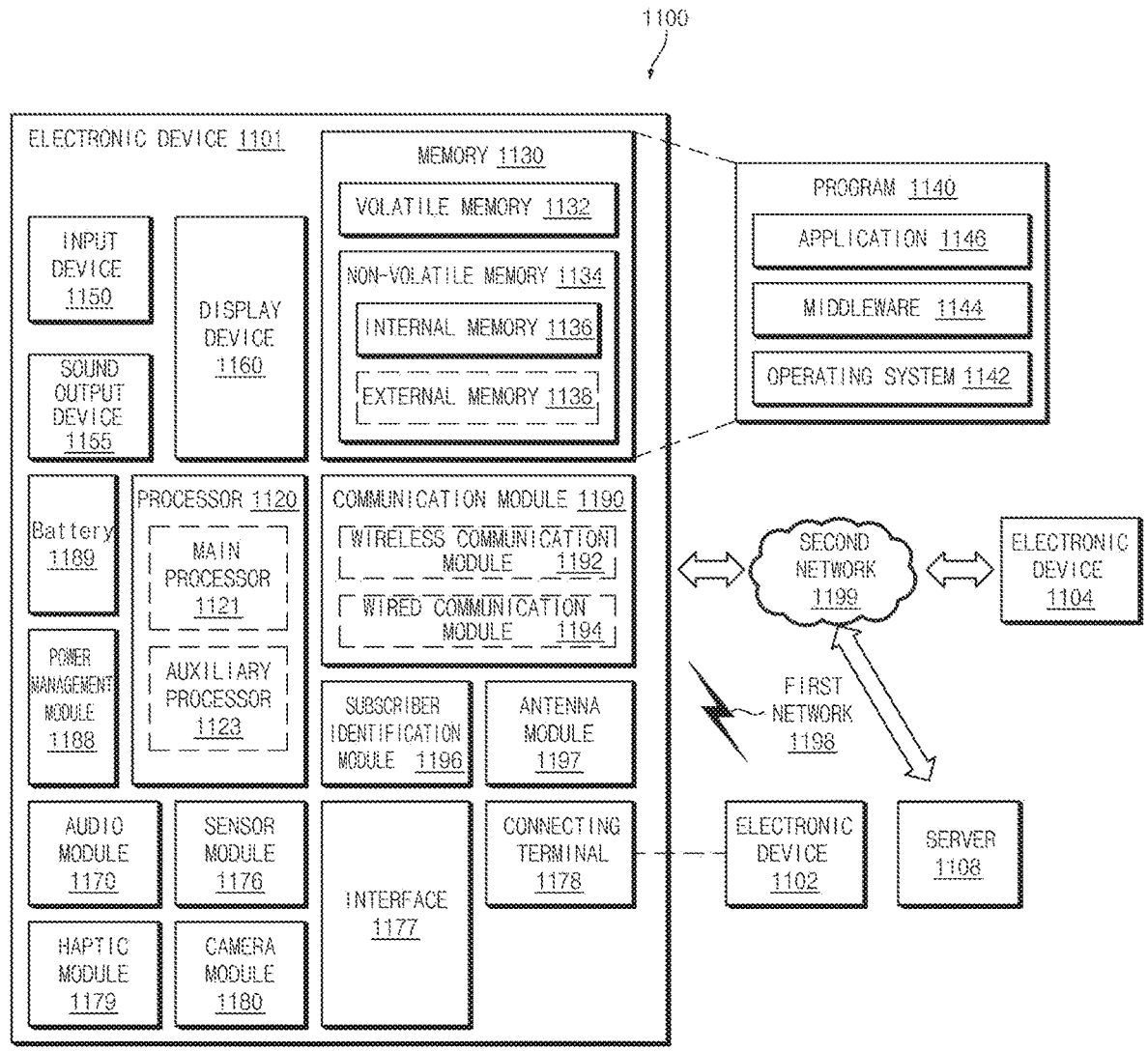
FIG. 11 is a block diagram of an electronic device in a network environment according to an embodiment of the disclosure.

FIG. 11 is a block diagram of an electronic device in a network environment according to an embodiment of the disclosure.

Referring to FIG. 11, an electronic device 1101 in a network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to an embodiment, as at least a part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as a part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as a part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thererto. The memory 1130 may include the volatile memory 1132 or the non-volatile memory 1134. The non-volatile memory 1134 may include an internal memory 1136 or external memory 1138.

The program 1140 may be stored in the memory 1130 as software, and may include, for example, an operating system (OS) 1142, middleware 1144, or an application 1146.

The input device 1150 may receive a command or data to be used by another component (e.g., the processor 1120) of the electronic device 1101, from the outside (e.g., a user) of the electronic device 1101. The input device 1150 may include, for example, a microphone, a mouse, a keyboard, or a digital pen (e.g., a stylus pen).

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for incoming calls. According to an embodiment, the receiver may be implemented as separate from, or as a part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) directly (e.g., wired) or wirelessly coupled with the electronic device 1101.

The sensor module 1176 may detect an operational state (e.g., power or temperature) of the electronic device 1101 or an environmental state (e.g., a state of a user) external to the electronic device 1101, and generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wired) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to an embodiment, the power management module 1188 may be implemented as at least a part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and support a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™ wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., PCB). According to an embodiment, the antenna module 1197 may include a plurality of antennas. In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may be transmitted or received between the communication module 1190 and the external electronic device via the selected at least one antenna. According to an embodiment, another component (e.g., a radio frequency integrated circuit (RFIC)) other than the radiating element may be additionally formed as a part of the antenna module 1197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type from, the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least a part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least a part of a reply to the request. To that end, a cloud computing, distributed computing, or client-server computing technology may be used, for example.

Figure 12:
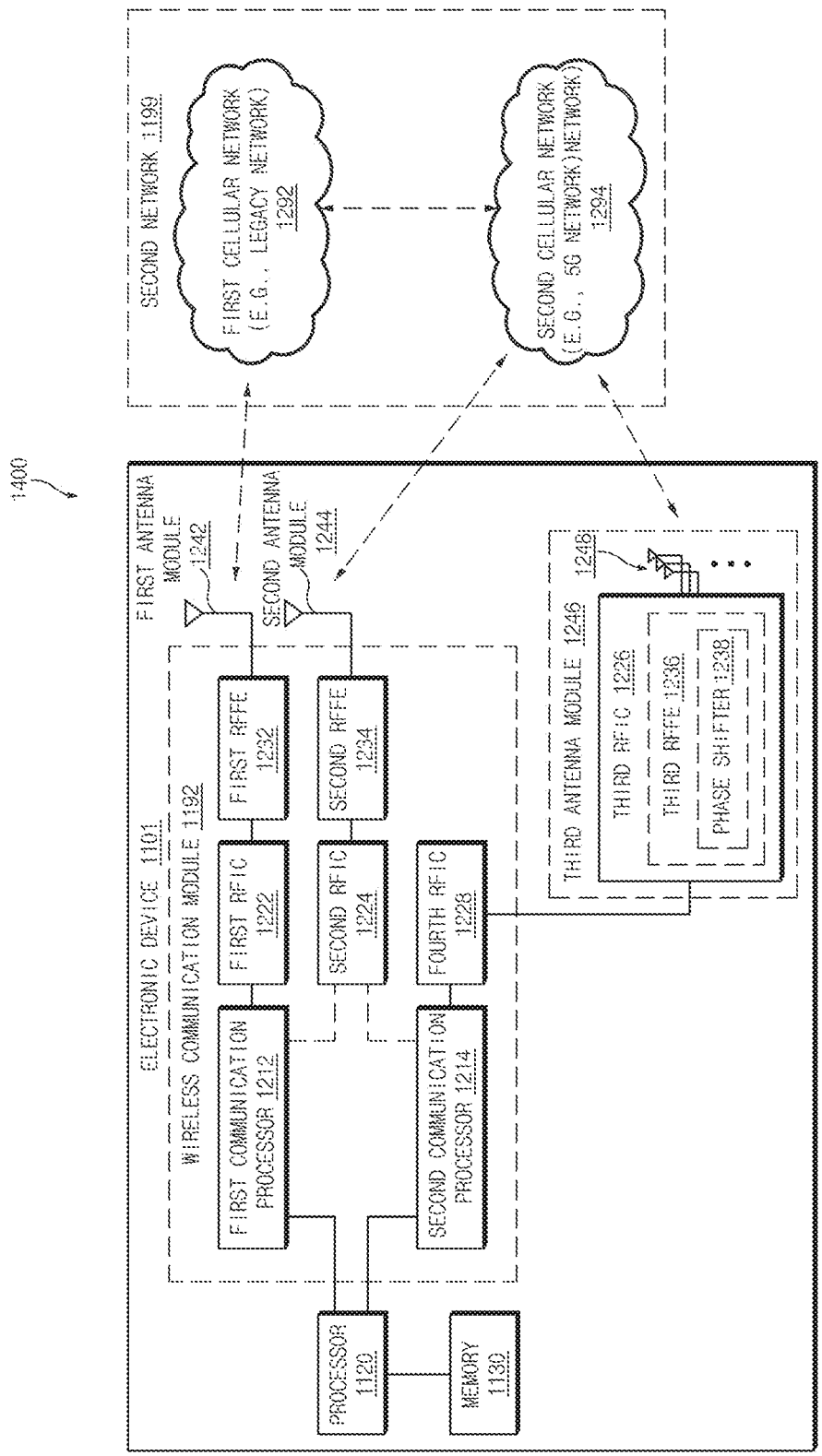
FIG. 12 illustrates an electronic device in a network environment including a plurality of cellular networks, according to an embodiment of the disclosure.

FIG. 12 illustrates an electronic device in a network environment including a plurality of cellular networks, according to an embodiment of the disclosure.

Referring to FIG. 12, the electronic device 1101 in a network environment 1400 may include a first communication processor 1212, a second communication processor 1214, a first radio frequency integrated circuit (RFIC) 1222, a second RFIC 1224, a third RFIC 1226, a fourth RFIC 1228, a first radio frequency front end (RFFE) 1232, a second RFFE 1234, a first antenna module 1242, a second antenna module 1244, and an antenna 1248. The electronic device 1101 may further include the processor 1120 and the memory 1130. The second network 1199 may include a first cellular network 1292 and a second cellular network 1294. According to another embodiment, the electronic device 1101 may further include at least one component of the components illustrated in FIG. 11, and the second network 1199 may further include at least another network. According to an embodiment, the first communication processor 1212, the second communication processor 1214, the first RFIC 1222, the second RFIC 1224, the fourth RFIC 1228, the first RFFE 1232, and the second RFFE 1234 may form at least a portion of the wireless communication module 1192. According to another embodiment, the fourth RFIC 1228 may be omitted or may be included as a part of the third RFIC 1226.

The first communication processor 1212 may support the establishment of a communication channel of a band to be used for wireless communication with the first cellular network 1292 and the legacy network communication through the established communication channel According to various embodiments, the first cellular network 1292 may be a legacy network including a 2nd generation (2G), 3rd generation (3G), 4th generation (4G), or long term evolution (LTE) network. The second communication processor 1214 may support the establishment of a communication channel corresponding to a specified band (e.g., about 6 GHz~about 60 GHz) among bands to be used for wireless communication with the second cellular network 1294 and 5G network communication via the established communication channel According to various embodiments, the second cellular network 1294 may be a 5G network defined in the 3GPP. Additionally, according to an embodiment, the first communication processor 1212 or the second communication processor 1214 may establish a communication channel for a specified band (e.g., about 6 GHz or lower) of the bands to be used for wireless communication with the second cellular network 1294 and may support 5G network communication through the established communication channel According to an embodiment, the first communication processor 1212 and the second communication processor 1214 may be implemented within a single chip or a single package. According to various embodiments, the first communication processor 1212 or the second communication processor 1214 may be implemented within a single chip or a single package together with the processor 1120, the auxiliary processor 1123, or the communication module 1190. According to an embodiment, the first communication processor 1212 and the second communication processor 1214 may be connected to each other directly or indirectly by an interface (not illustrated) so as to provide or receive data or a control signal in either direction or both directions.

In the case of transmitting a signal, the first RFIC 1222 may convert a baseband signal generated by the first communication processor 1212 into a radio frequency (RF) signal of about 700 MHz to about 3 GHz that is used in the first cellular network 1292 (e.g., a legacy network). At the time of reception, the RF signal may be obtained from the first cellular network 1292 (e.g., a legacy network) via an antenna (e.g., the first antenna module 1242) and may be preprocessed via an RFFE (e.g., the first RFFE 1232). The first RFIC 1222 may convert the preprocessed RF signal to a baseband signal so as to be processed by the first communication processor 1212.

In the case of transmitting a signal, the second RFIC 1224 may convert a baseband signal generated by the first communication processor 1212 or the second communication processor 1214 into an RF signal (hereinafter referred to as a "5G Sub6 RF signal") in a Sub6 band (e.g., alternatively 6 GHz or lower) used in the second cellular network 1294 (e.g., a 5G network). At the time of reception, the 5G Sub6 RF signal may be obtained from the second cellular network 1294 (e.g., 5G network) via an antenna (e.g., the second antenna module 1244) and may be preprocessed via RFFE (e.g., the second RFFE 1234). The second RFIC 1224 may convert the pre-processed 5G Sub6 RF signal into a baseband signal so as to be processed by a communication processor corresponding to the 5G Sub6 RF signal from among the first communication processor 1212 or the second communication processor 1214.

The third RFIC 1226 may convert a baseband signal generated by the second communication processor 1214 into an RF signal (hereinafter referred to as a "5G Above6 RF signal") in a 5G Above6 band (e.g., approximately 6 GHz to approximately 60 GHz) to be used in the second cellular network 1294 (e.g., a 5G network). In the case of receiving a signal, the 5G Above6 RF signal may be obtained from the second cellular network 1294 (e.g., a 5G network) through an antenna (e.g., the antenna 1248) and may be pre-processed through a third RFFE 1236. The third RFIC 1226 may convert the pre-processed 5G Above6 RF signal into a baseband signal so as to be processed by the second communication processor 1214. According to an embodiment, the third RFFE 1236 may be implemented as a part of the third RFIC 1226.

According to an embodiment, the electronic device 1101 may include the fourth RFIC 1228 independently of the third RFIC 1226 or as at least a part of the third RFIC 1226. In this case, the fourth RFIC 1228 may convert a baseband signal generated by the second communication processor 1214 into an RF signal (hereinafter referred to as an "IF signal") in an intermediate frequency band (e.g., ranging from about 9 GHz to about 11 GHz) and may provide the IF signal to the third RFIC 1226. The third RFIC 1226 may convert the IF signal into the 5G Above6 RF signal. In the case of receiving a signal, the 5G Above6 RF signal may be received from the second cellular network 1294 (e.g., a 5G network) through an antenna (e.g., the antenna 1248) and may be converted into an IF signal by the third RFIC 1226. The fourth RFIC 1228 may convert the IF signal into a baseband signal so as to be processed by the second communication processor 1214.

According to an embodiment, the first RFIC 1222 and the second RFIC 1224 may be implemented with a part of a single chip or a single package. According to an embodiment, the first RFFE 1232 and the second RFFE 1234 may be implemented with a part of a single chip or a single package. According to an embodiment, at least one of the first antenna module 1242 or the second antenna module 1244 may be omitted or may be combined with any other antenna module to process RF signals in a plurality of bands.

According to an embodiment, the third RFIC 1226 and the antenna 1248 may be disposed at the same substrate to form a third antenna module 1246. For example, the wireless communication module 1192 or the processor 1120 may be disposed at a first substrate (e.g., a main PCB). In this case, the third RFIC 1226 may be disposed in a partial region (e.g., on a lower surface) of a second substrate (e.g., a sub PCB) independent of the first substrate, and the antenna 1248 may be disposed in another partial region (e.g., on an upper surface) of the second substrate. As such, the third antenna module 1246 may be formed. As the third RFIC 1226 and the antenna 1248 are disposed at the same substrate, it may be possible to decrease a length of a transmission line between the third RFIC 1226 and the antenna 1248. The decrease in the transmission line may make it possible to reduce the loss (or attenuation) of a signal in a high-frequency band (e.g., approximately 6 GHz to approximately 60 GHz) used for the 5G network communication due to the transmission line. For this reason, the electronic device 1101 may improve the quality or speed of communication with the second cellular network 1294 (e.g., 5G network).

According to an embodiment, the antenna 1248 may be formed as an antenna array including a plurality of antenna elements capable of being used for beamforming. In this case, the third RFIC 1226 may be, for example, a part of the third RFFE 1236 and may include a plurality of phase shifters 1238 corresponding to a plurality of antenna elements. In transmission, each of the plurality of phase shifters 1238 may convert the phase of 5G Above6 RF signal transmitted to the outside (e.g., the base station of 5G network) of the electronic device 1101 via the corresponding antenna element. In reception, each of the plurality of phase shifters 1238 may convert the phase of 5G Above6 RF signal, which is received from the outside via the corresponding antenna element, to the same or substantially similar phase. This makes it possible to transmit or receive a signal between the electronic device 1101 and the outside via the beamforming.

The second cellular network 1294 (e.g., a 5G network) may be used independently of the first cellular network 1292 (e.g., a legacy network) (e.g., stand-alone (SA)) or may be used in conjunction with the first cellular network 1292 (e.g., non-stand alone (NSA)). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 1101 may access the access network of the 5G network and may access an external network (e.g., Internet) under control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 1230 so as to be accessed by any other component (e.g., the processor 1120, the first communication processor 1212, or the second communication processor 1214).

The electronic device according to various embodiments may be any of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or a part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least a part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an antenna module included in an electronic device may compensate for a shaded region of an external device mounted in the electronic device, and thus a seamless operation of 5G mobile communication of the external device may be supported.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing configured to mount at least a part of an external device operating $5^{th}$ generation (5G) mobile communication;
   a support member connected to one region of the housing to support wearing of the electronic device with respect to one region of a user's body;
   a second antenna module disposed in a first region of the housing adjacent to a first antenna module among at least one antenna module included in the external device to face at least a part of the first antenna module;
   at least one third antenna module disposed in at least one of a second region of the housing or a third region of the support member; and
   at least one conductive member electrically connecting between the second antenna module and the at least one third antenna module,
   wherein an external signal received via at least a part of the at least one third antenna module is delivered to the second antenna module based on the at least one conductive member to be induced to the first antenna module adjacent to the second antenna module, and
   wherein a signal of the external device, which is induced from the first antenna module to the second antenna module, is delivered to the at least part of the at least one third antenna module based on the at least one conductive member and is radiated to an outside.

2. The electronic device of claim 1, wherein at least one of the second region of the housing or the third region of the support member includes a region that is not reached by beam coverage of the external device.

3. The electronic device of claim 1, wherein at least one of the second region of the housing or the third region of the support member includes a region in which the at least one third antenna module is not shielded by a structure of the electronic device.

4. The electronic device of claim 1, wherein at least one of the first region of the housing or the second region of the housing includes at least one of an internal space of the housing or an interior of a frame itself forming the housing.

5. The electronic device of claim 1, wherein the second antenna module is coupled with the first antenna module.

6. The electronic device of claim 1, further comprising:
   a fourth antenna module disposed in a fourth region of the housing adjacent to the second antenna module.

7. The electronic device of claim 6, wherein at least a part of the fourth region includes a region facing a ground.

8. The electronic device of claim 6, further comprising:
   at least one processor; and
   a switch configured to support a selective operation of the at least one third antenna module and the fourth antenna module,
   wherein the at least one processor is configured to:
      control the switch to operate one of the at least one third antenna module and the fourth antenna module based on a comparison between a received signal strength indicator (RSSI) value of the at least one third antenna module and an RSSI value of the fourth antenna module.

9. The electronic device of claim 8, further comprising:
   a connector configured to connect to an interface included in the external device when the external device is mounted,
   wherein the at least one processor is further configured to:
      determine whether the external device is mounted based on whether the connector connects to the interface.

10. The electronic device of claim 8, wherein the at least one processor is further configured to:
    when it is determined that at least one of the RSSI value of the at least one third antenna module or the RSSI value of the fourth antenna module is not less than a specified threshold value, transmit data or a signal associated with an activation request of the first antenna module to the external device.

11. The electronic device of claim 1, further comprising:
    an amplifier configured to amplify at least one of an output signal of the second antenna module or an output signal of the at least one third antenna module.

12. The electronic device of claim 1, wherein at least one antenna element included in the first antenna module, at least one antenna element included in the second antenna module, or at least one antenna element included in the at least one third antenna module correspond to one another one-to-one.

13. The electronic device of claim 1, further comprising:
    a cover fastened to at least a part of the housing,
    wherein the cover includes an opening in a region corresponding to at least one antenna module included in the external device, when the external device is mounted.

14. The electronic device of claim 1, wherein the electronic device includes at least one of a head mounted display (HMD) device or a dock device.

15. An electronic device comprising:
    a housing in which at least a part of an external device communicating in a frequency band of 20 gigahertz (GHz) or more is mounted;
    a second antenna module disposed in a first region of the housing adjacent to a first antenna module among at least one antenna module included in the external device to face at least a part of the first antenna module;
    at least one third antenna module disposed in a second region of the housing; and
    at least one conductive member electrically connecting between the second antenna module and the at least one third antenna module, wherein an external signal received via at least a part of the at least one third antenna module is delivered to the second antenna module based on the at least one conductive member to be induced to the first antenna module adjacent to the second antenna module, wherein a signal of the external device, which is induced from the first antenna module to the second antenna module, is delivered to the at least part of the at least one third antenna module based on the at least one conductive member and is radiated to an outside, and wherein at least one antenna element included in the first antenna module, at least one antenna element included in the second antenna module, or at least one antenna element included in the at least one third antenna module correspond to one another one-to-one such that a delay line according to a wave front of the signal is maintained during signal transmission/reception.

16. The electronic device of claim 15, wherein the second region of the housing includes a region that is not reached by beam coverage of the external device.

17. The electronic device of claim 15, wherein the second region of the housing includes a partial region of a support member connected to one region of the housing to support wearing of the electronic device with respect to one region of a user's body.

18. The electronic device of claim 15, further comprising:
a fourth antenna module disposed in a third region of the housing adjacent to the second antenna module.

19. The electronic device of claim 18, further comprising:
at least one processor; and
a switch configured to support a selective operation of the at least one third antenna module and the fourth antenna module, wherein the at least one processor is configured to:
control the switch to operate one of the at least one third antenna module and the fourth antenna module based on a comparison between a quality of a signal received by the at least one third antenna module and a quality of a signal received by the fourth antenna module.

20. The electronic device of claim 18, further comprising:
at least one processor, and
a switch configured to support a selective operation of the at least one third antenna module and the fourth antenna module, wherein the at least one processor is configured to:
when it is determined that at least one of a strength of a signal received by the at least one third antenna module or a strength of a signal received by the fourth antenna module is not less than a specified threshold value, transmit data or a signal associated with an activation request of the first antenna module to the external device.

* * * * *